(12) United States Patent
Ma et al.

(10) Patent No.: US 12,036,867 B1
(45) Date of Patent: Jul. 16, 2024

(54) TWO-GEAR AND DUAL-MOTOR DRIVEN HYBRID POWER TRANSMISSION DEVICE AND TRANSMISSION METHOD THEREFOR

(71) Applicant: HARBIN DONGAN AUTOMOTIVE ENGINE MANUFACTURING CO., LTD., Heilongjiang (CN)

(72) Inventors: Jing Ma, Heilongjiang (CN); Wei Guan, Heilongjiang (CN); Lin Yang, Heilongjiang (CN); Junyuan Su, Heilongjiang (CN); Zhaopeng Chai, Heilongjiang (CN); Shutao Yao, Heilongjiang (CN); Zhangxia Zhou, Heilongjiang (CN); Xiaoyu Li, Heilongjiang (CN); Binlong Li, Heilongjiang (CN); Yanhui Zhao, Heilongjiang (CN); Xiaodong Zhang, Heilongjiang (CN); Jiqiu Bing, Heilongjiang (CN); Xiaoxing Yuan, Heilongjiang (CN); Yanyu He, Heilongjiang (CN); Mo Wang, Heilongjiang (CN); Ming Song, Heilongjiang (CN); Peng Zhang, Heilongjiang (CN)

(73) Assignee: HARBIN DONGAN AUTOMOTIVE ENGINE MANUFACTURING CO., LTD. (CN)

( * ) Notice: Subject to any disclaimer, the term of this patent is extended or adjusted under 35 U.S.C. 154(b) by 0 days.

(21) Appl. No.: 18/587,003

(22) Filed: Feb. 26, 2024

(30) Foreign Application Priority Data

Mar. 30, 2023 (CN) .......................... 202310329987.0

(51) Int. Cl.
*B60K 6/365* (2007.10)
*B60K 6/442* (2007.10)
(Continued)

(52) U.S. Cl.
CPC .............. *B60K 6/365* (2013.01); *B60K 6/442* (2013.01); *B60K 6/547* (2013.01); *B60L 7/10* (2013.01);
(Continued)

(58) Field of Classification Search
CPC .............. F16H 3/66; F16H 2200/0052; F16H 2200/201; F16H 2200/2038;
(Continued)

(56) References Cited

U.S. PATENT DOCUMENTS 7,201,690 B2 * 4/2007 Miura .................... B60W 10/08
475/5
8,721,482 B2 * 5/2014 Takami .................. B60K 6/547
475/5
(Continued)

FOREIGN PATENT DOCUMENTS

CN 113002286 6/2021
CN 116533748 8/2023

*Primary Examiner* — Roger L Pang
(74) *Attorney, Agent, or Firm* — Onello & Mello, LLP

(57) ABSTRACT

A two-gear and dual-motor driven hybrid power transmission device and a transmission method therefore are provided, belonging to the technical field of transmissions. An input end of an input shaft is connected to an engine power system, and an output end of the input shaft is connected to a front-end motor by means of a front-row planetary gear train. The front-row planetary gear train is connected to one end of a first clutch, another end of the first clutch is connected to an input end of an output shaft, and an output end of the output shaft is connected to a rear axle of a vehicle. The output shaft is connected to a rear-end motor by means of a rear-row planetary gear train, and the rear-row planetary gear train is connected to a second clutch and a third clutch.

10 Claims, 6 Drawing Sheets

(51) Int. Cl.
*B60K 6/547* (2007.10)
*B60L 7/10* (2006.01)
*B60L 50/61* (2019.01)
*F16H 3/66* (2006.01)
*B60K 6/26* (2007.10)

(52) U.S. Cl.
CPC ............... *B60L 50/61* (2019.02); *F16H 3/66* (2013.01); *B60K 2006/266* (2013.01); *B60Y 2200/92* (2013.01); *F16H 2200/201* (2013.01); *F16H 2200/2038* (2013.01); *F16H 2200/2097* (2013.01)

(58) Field of Classification Search
CPC ..... F16H 2200/2097; F16H 2200/0034; B60K 6/365; B60K 6/442; B60K 6/547; B60K 2006/266
USPC ............................................. 475/5, 275, 282
See application file for complete search history.

(56) References Cited

U.S. PATENT DOCUMENTS

| | | | | |
|---|---|---|---|---|
| 2004/0058769 | A1* | 3/2004 | Larkin | B60W 20/00 903/910 |
| 2007/0173373 | A1* | 7/2007 | Kinugasa | B60W 10/115 477/3 |
| 2008/0139360 | A1* | 6/2008 | Hayashi | F16H 3/725 477/3 |
| 2008/0196955 | A1* | 8/2008 | Minamikawa | B60W 10/115 475/5 |

* cited by examiner

TWO-GEAR AND DUAL-MOTOR DRIVEN HYBRID POWER TRANSMISSION DEVICE AND TRANSMISSION METHOD THEREFOR

CROSS-REFERENCE TO RELATED APPLICATION

This patent application claims the benefit and priority of Chinese Patent Application No. 202310329987.0 filed with the China National Intellectual Property Administration on Mar. 30, 2023, the disclosure of which is incorporated by reference herein in its entirety as part of the present application.

TECHNICAL FIELD

The present disclosure relates to a two-gear and dual-motor driven hybrid power transmission device and a transmission method therefore, belonging to the technical field of transmission.

BACKGROUND

The existing hybrid transmission devices are mainly of a continuous variable transmission structure and a single-gear structure. The control system of the continuous variable transmission structure is relatively complex, and the single-gear structure cannot give full play to the comprehensive performance of the motor.

SUMMARY

In order to solve the problems in the background art, the present disclosure provides a two-gear and dual-motor driven hybrid power transmission device and a transmission method therefore.

In order to achieve the objective above, the present disclosure provides the following technical solution: a two-gear and dual-motor driven hybrid power transmission device includes an input shaft, a front-end motor, a rear-end motor, an output shaft, a first clutch, a second clutch, a third clutch, a front-row planetary gear train, and a rear-row planetary gear train. The front-row planetary gear train includes a first sun gear, a first planetary gear, a first ring gear, and a first planet carrier. The rear-row planetary gear train includes a second sun gear, a second planetary gear, a second ring gear, a second planet carrier, a third sun gear, and a third planetary gear. An input end of the input shaft is connected to a power system of an engine, and the first sun gear and the first planet carrier are sleeved outside the input shaft. The first planet carrier is fixedly connected to the input shaft, and the first planet carrier is connected to one end of the first clutch. The first planetary gear is arranged on the first planet carrier, and the first planetary gear is meshed with both the first sun gear and the first ring gear. The first ring gear is fixedly installed on a transmission housing. The first sun gear is connected to a rotor of the front-end motor, and a stator of the front-end motor is fixedly connected to the transmission housing. Another end of the first clutch is connected to an input end of the output shaft, and an output end of the output shaft is in transmission connection with a vehicle rear axle. The second sun gear, the second planet carrier, and the third sun gear are sleeved outside the output shaft. The second planet carrier is fixedly connected to the output shaft. The second planetary gear and the third planetary gear are arranged on the second planet carrier. The second planetary gear is meshed with all the second sun gear, the second ring gear, and the third planetary gear. The second sun gear is connected to a rotor of the rear-end motor, and a stator of the rear-end motor is fixedly connected to the transmission housing. The second ring gear is connected to one end of the second clutch. The third planetary gear is meshed with the third sun gear. The third sun gear is connected to one end of the third clutch, and another end of the second clutch and another end of the third clutch are both connected to the transmission housing.

The present disclosure provides a transmission method for a first gear of an EV (electric vehicle) mode of a two-gear and dual-motor driven hybrid power transmission device, including the following steps:
- S1: arranging the engine and the front-end motor in a non-operating state, arranging the first clutch and the third clutch in a disengaged state, arranging the second clutch in an engaged state, and arranging the rear-end motor in an operating state;
- S2: starting the rear-end motor to drive the second sun gear to rotate;
- S3: fixing, by the second clutch in the engaged state, a position of the second ring gear, so as to drive the second planetary gear to rotate by the second sun gear;
- S4: driving, by the second planetary gear, the second planet carrier to rotate; and
- S5: driving, by the second planet carrier, the output shaft to rotate, so as to output power.

The present disclosure provides a transmission method for a second gear of an EV (electric vehicle) mode of a two-gear and dual-motor driven hybrid power transmission device, including the following steps:
- S1: arranging the engine and the front-end motor in a non-operating state, arranging the first clutch and the second clutch in a disengaged state, arranging the third clutch in an engaged state, and arranging the rear-end motor in an operating state;
- S2: starting the rear-end motor to drive the second sun gear to rotate;
- S3: driving, by the second sun gear, the second planetary gear to rotate; and
- S4: fixing, by the third clutch in the engaged state, a position of the third sun gear, so as to drive both the third planetary gear and the second planet carrier to rotate by the second planetary gear; and
- S5: driving, by the second planet carrier, the output shaft to rotate, so as to output power.

The present disclosure provides a transmission method for a first gear of a series mode of a two-gear and dual-motor driven hybrid power transmission device, including the following steps:
- S1: arranging all the front-end motor, the rear-end motor, and the engine in an operating state, arranging the first clutch and the third clutch in a disengaged state, and arranging the second clutch in an engaged state;
- S2: starting the engine to drive the input shaft to rotate;
- S3: driving, by the input shaft, the first planet carrier to rotate;
- S4: driving, by the first planet carrier, the first planetary gear to rotate;
- S5: driving, by the first planetary gear, the first sun gear to rotate;
- S6: driving, by the first sun gear, a rotor of the front-end motor to rotate, and storing energy in a battery when the front-end motor generates electric power;
- S7: powering the rear-end motor by the battery;
- S8: driving, by the rear-end motor, the second sun gear to rotate;

- S9: fixing, by the second clutch in the engaged state, a position of the second ring gear, so as to drive the second planetary gear to rotate by the second sun gear;
- S10: driving, by the second planetary gear, the second planet carrier to rotate; and
- S11: driving, by the second planet carrier, the output shaft to rotate, so as to output power.

The present disclosure provides a transmission method for a second gear of a series mode of a two-gear and dual-motor driven hybrid power transmission device, including the following steps:
- S1: arranging all the front-end motor, the rear-end motor, and the engine in an operating state, arranging the first clutch and the second clutch in a disengaged state, and arranging the third clutch in an engaged state;
- S2: starting the engine to drive the input shaft to rotate;
- S3: driving, by the input shaft, the first planet carrier to rotate;
- S4: driving, by the first planet carrier, the first planetary gear to rotate;
- S5: driving, by the first planetary gear, the first sun gear to rotate;
- S6: driving, by the first sun gear, a rotor of the front-end motor to rotate, and storing energy in a battery when the front-end motor generates electric power;
- S7: powering the rear-end motor by the battery;
- S8: driving, by the rear-end motor, the second sun gear to rotate;
- S9: fixing, by the third clutch in the engaged state, a position of the third sun gear, so as to drive both the third planetary gear and the second planet carrier to rotate by the second planetary gear; and
- S10: driving, by the second planet carrier, the output shaft to rotate, so as to output power.

The present disclosure provides a transmission method for a first gear of a parallel mode of a two-gear and dual-motor driven hybrid power transmission device, including the following steps:
- S1: arranging the front-end motor in a non-operating state, arranging the first clutch and the second clutch in an engaged state, arranging the third clutch in a disengaged state, and arranging the engine and the rear-end motor in an operating state;
- S2: starting the engine to drive the input shaft to rotate, meanwhile starting the rear-end motor to drive the second sun gear to rotate;
- S3: driving, by the input shaft, the first planet carrier to rotate, and driving, by the first planet carrier, the first clutch to rotate;
- S4: fixing, by the second clutch in the engaged state, a position of the second ring gear, so as to drive the second planetary gear to rotate by the second sun gear, and driving, by the second planetary gear, the second planet carrier to rotate; and
- S5: driving, by both the first clutch and the second planet carrier, the output shaft to rotate, so as to output power.

The present disclosure provides a transmission method for a second gear of a parallel mode of a two-gear and dual-motor driven hybrid power transmission device, including the following steps:
- S1: arranging the front-end motor in a non-operating state, arranging the first clutch and the third clutch in an engaged state, arranging the second clutch in a disengaged state, and arranging the engine and the rear-end motor in an operating state;
- S2: starting the engine to drive the input shaft to rotate, meanwhile starting the rear-end motor to drive the second sun gear to rotate;
- S3: driving, by the input shaft, the first planet carrier to rotate, and driving, by the first planet carrier, the first clutch to rotate;
- S4: driving, by the second sun gear, the second planetary gear to rotate; and as a position of a third sun gear is fixed by the third clutch in the engaged state, the third planetary gear and the second planet carrier are both driven to rotate by the second planetary gear; and
- S5: driving, by both the first clutch and the second planet carrier, the output shaft to rotate, so as to output power.

The present disclosure provides a transmission method for a direct-drive gear of a two-gear and dual-motor driven hybrid power transmission device, including the following steps:
- S1: arranging the front-end motor and the rear-end motor in a non-operating state, arranging the second clutch and the third clutch in a disengaged state, arranging the first clutch in an engaged state, and arranging the engine in an operating state;
- S2: starting the engine to drive the input shaft to rotate;
- S3: driving, by the input shaft, the first planet carrier to rotate;
- S4: driving, by the first planet carrier, the first clutch to rotate; and
- S5: driving, by the first clutch, the output shaft to rotate, so as to output power.

The present disclosure provides a transmission method for a brake recovery gear of a two-gear and dual-motor driven hybrid power transmission device, including the following steps:
- S1: arranging both the engine and the front-end motor in a non-operating state, arranging the first clutch and the third clutch in a disengaged state, arranging the second clutch in an engaged state, and arranging the rear-end motor in an operating state;
- S2: driving, by the output shaft, the second planet carrier to rotate;
- S3: driving, by the second planet carrier, the second planetary gear to rotate;
- S4: fixing, by the second clutch in the engaged state, a position of the second ring gear, so as to drive the second sun gear to rotate by the second planetary gear;
- S5: driving, by the second sun gear, a rotor of the rear-end motor to rotate; and
- S6: storing power energy in a battery when the rear-end motor generates electric power.

The present disclosure provides a transmission method for an idle power generation gear of a two-gear and dual-motor driven hybrid power transmission device, including the following steps:
- S1: arranging both the engine and the front-end motor in an operating state, arranging all the first clutch, the second clutch, and the third clutch in a disengaged state, and arranging the rear-end motor in a non-operating state;
- S2: starting the engine to drive the input shaft to rotate;
- S3: driving, by the input shaft, the first planet carrier to rotate;
- S4: driving, by the first planet carrier, the first planetary gear to rotate;
- S5: driving, by the first planetary gear, the first sun gear to rotate; and S6: driving, by the first sun gear, a rotor of the front-end motor to rotate, and storing energy in a battery when the front-end motor generates electric power.

Compared with the prior art, the present disclosure achieves beneficial effects as follows:

According to different combinations of the first clutch, the second clutch, and the third clutch, as well as different operating states of the engine, the front-end motor, and the rear-end motor, multiple gear modes, such as a first gear of an EV mode, a second gear of the EV mode, a first gear of a series mode, a second gear of the series mode, a first gear of a parallel mode, a second gear of the parallel mode, a direct-drive gear, a brake recovery gear, and an idle power generation gear, can be achieved. The transmission device in the present disclosure can adapt to the requirements of different operating environmental conditions of a vehicle, and improve the economic fuel economy of the vehicle. The planetary gear trains and the clutches are simple to assemble, few parts are used, and the cost and processing difficulty of parts are low. The transmission device in the present disclosure is easy to achieve, has high cost performance, and is convenient to use and popularize.

DETAILED DESCRIPTION OF THE EMBODIMENTS

Figure 1:
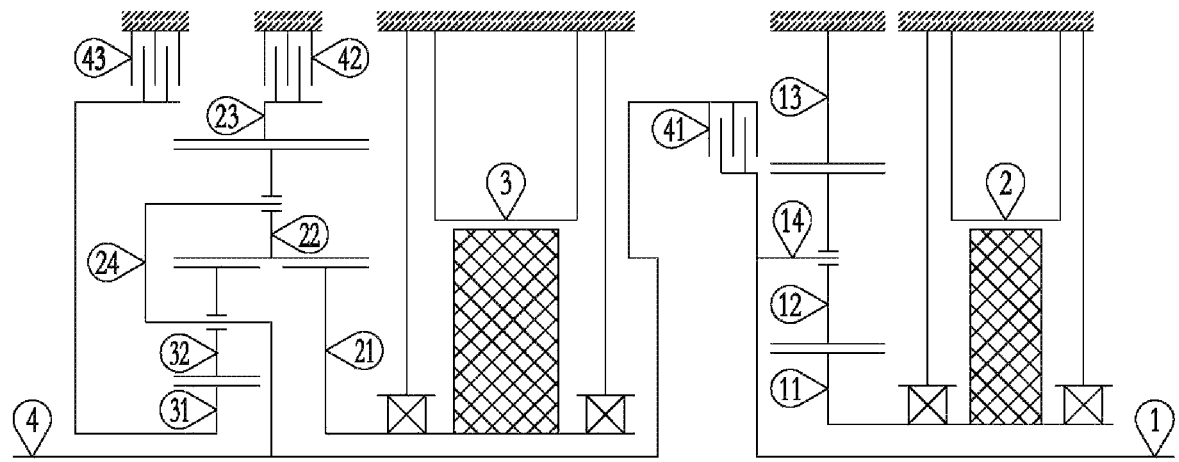
FIG. 1 is a schematic diagram of a mechanical structure according to an embodiment of the present disclosure.
Figure 2:
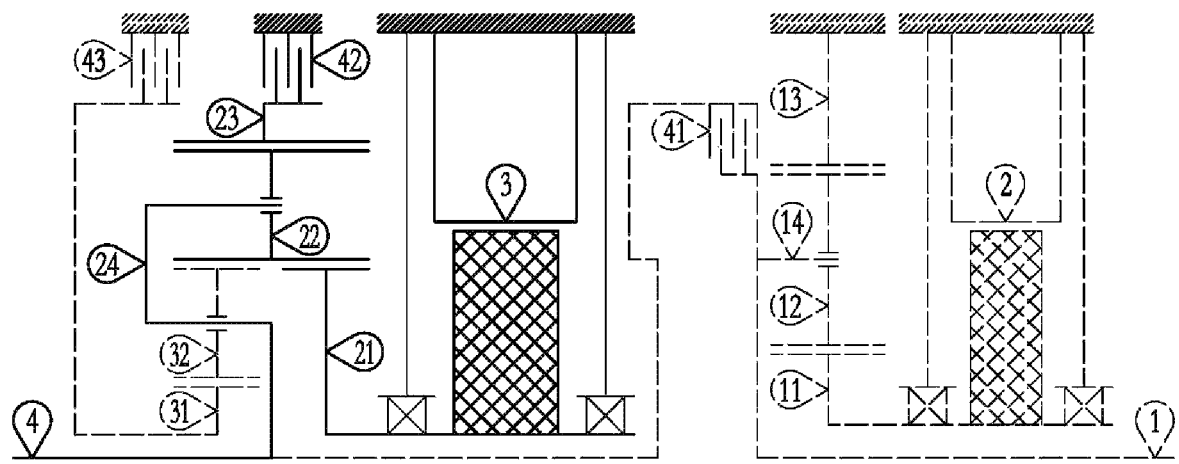
FIG. 2 is a schematic diagram of a mechanical structure of a first gear of an EV mode according to an embodiment of the present disclosure.
Figure 3:
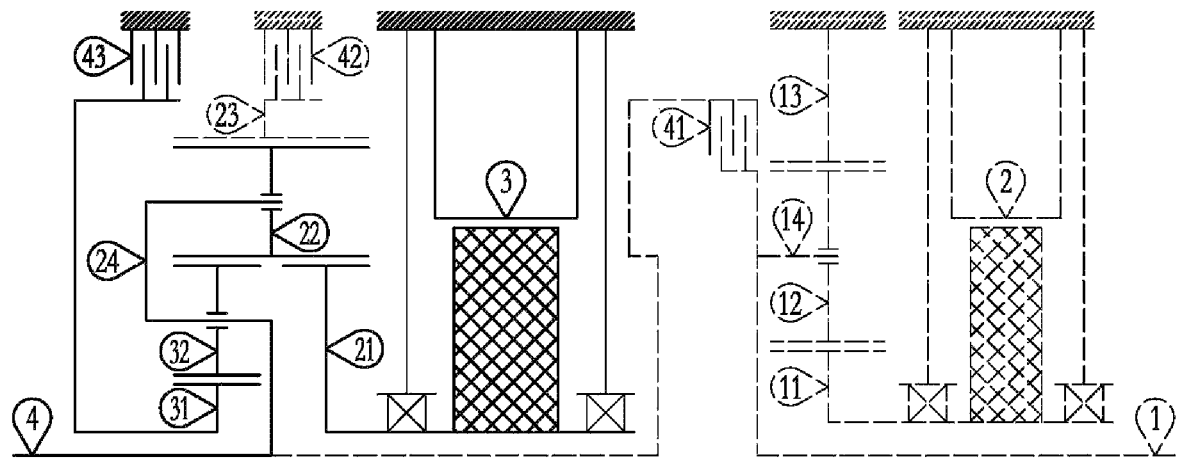
FIG. 3 is a schematic diagram of a mechanical structure of a second gear of an EV mode according to an embodiment of the present disclosure.
Figure 4:
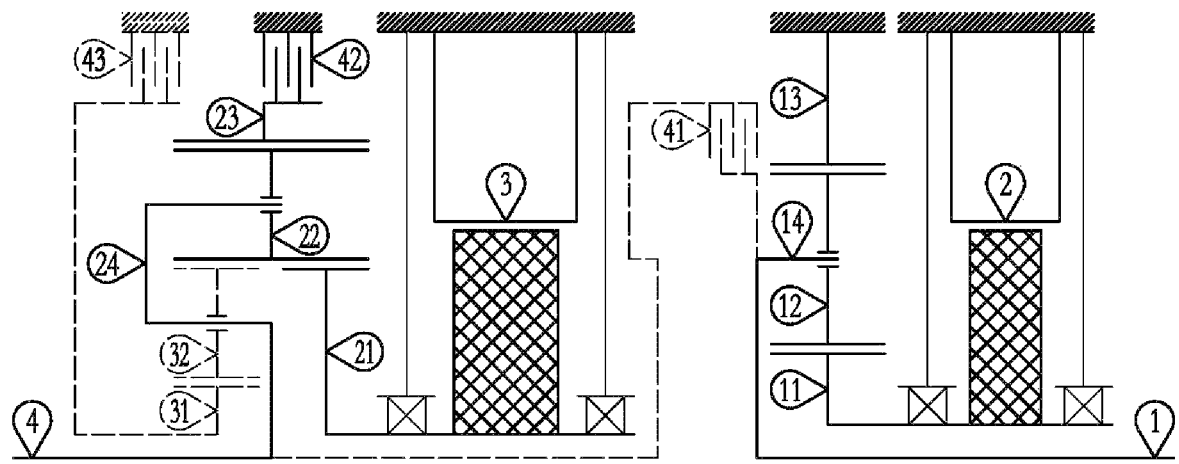
FIG. 4 is a schematic diagram of a mechanical structure of a first gear of a series mode according to an embodiment of the present disclosure.
Figure 5:
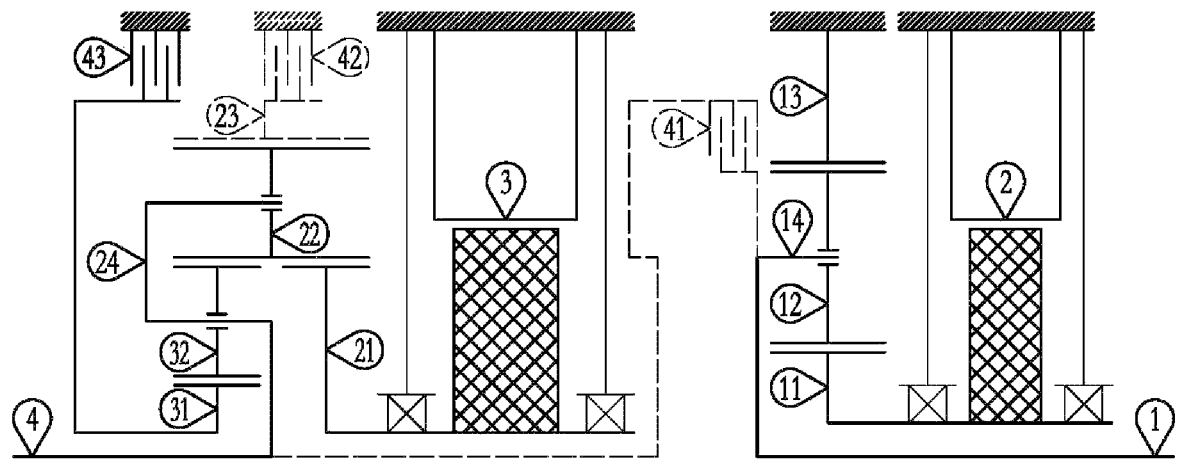
FIG. 5 is a schematic diagram of a mechanical structure of a second gear of a series mode according to an embodiment of the present disclosure.
Figure 6:
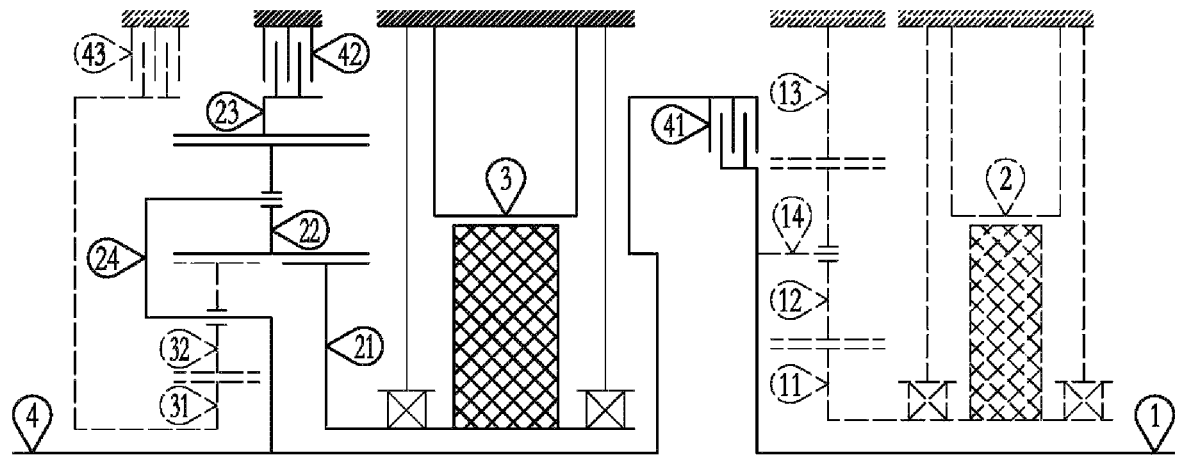
FIG. 6 is a schematic diagram of a mechanical structure of a first gear of a parallel mode according to an embodiment of the present disclosure.
Figure 7:
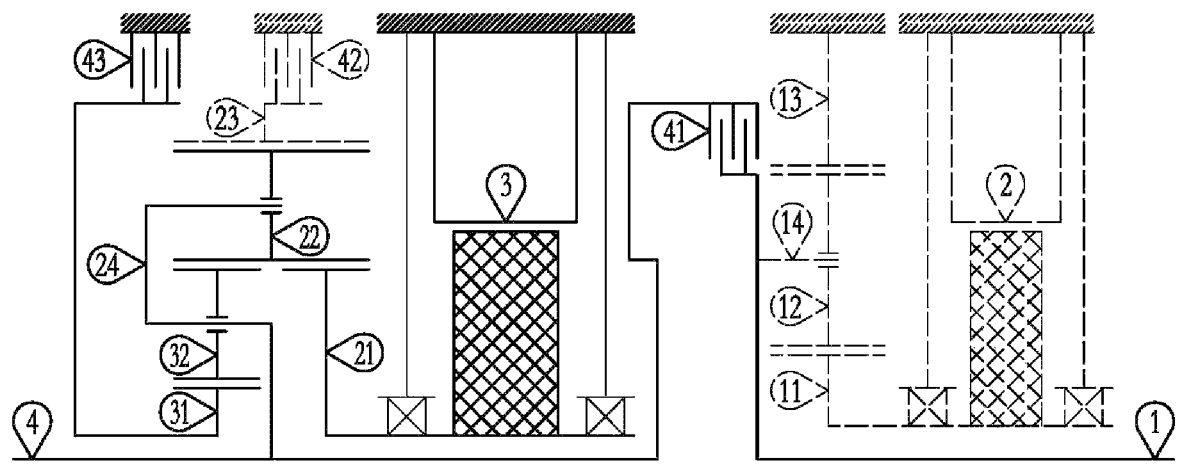
FIG. 7 is a schematic diagram of a mechanical structure of a second gear of a parallel mode according to an embodiment of the present disclosure.
Figure 8:
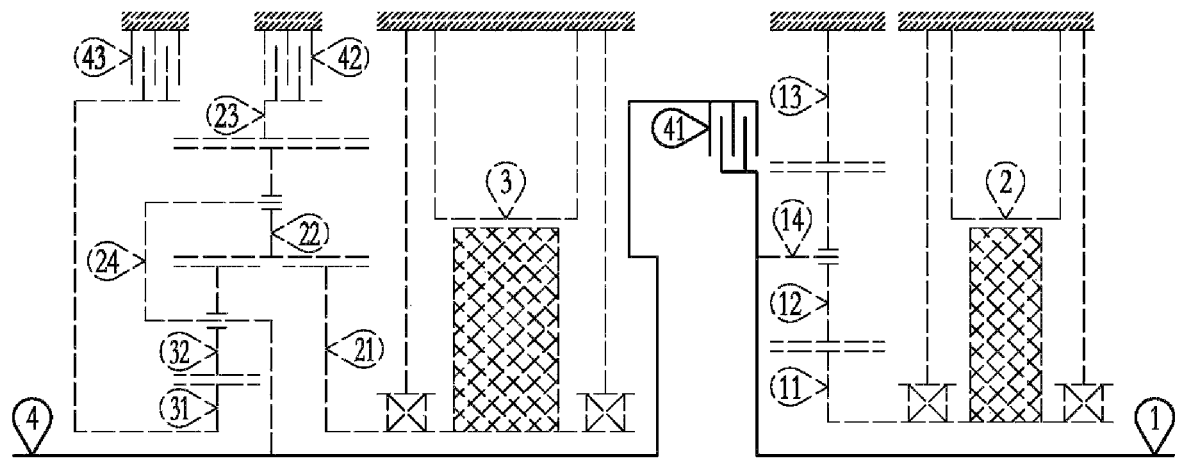
FIG. 8 is a schematic diagram of a mechanical structure of a direct-drive gear according to an embodiment of the present disclosure.
Figure 9:
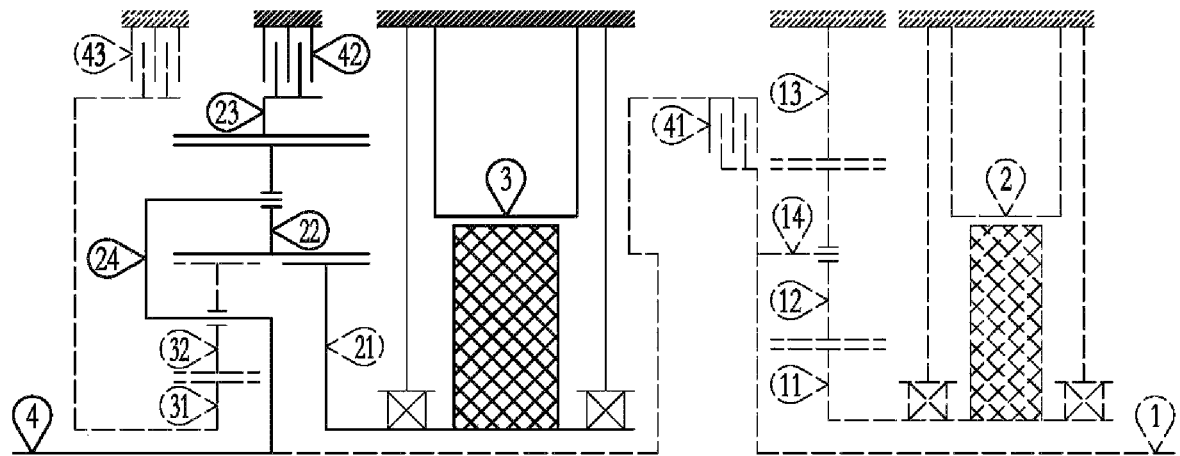
FIG. 9 is a schematic diagram of a mechanical structure of a brake recovery gear according to an embodiment of the present disclosure.
Figure 10:
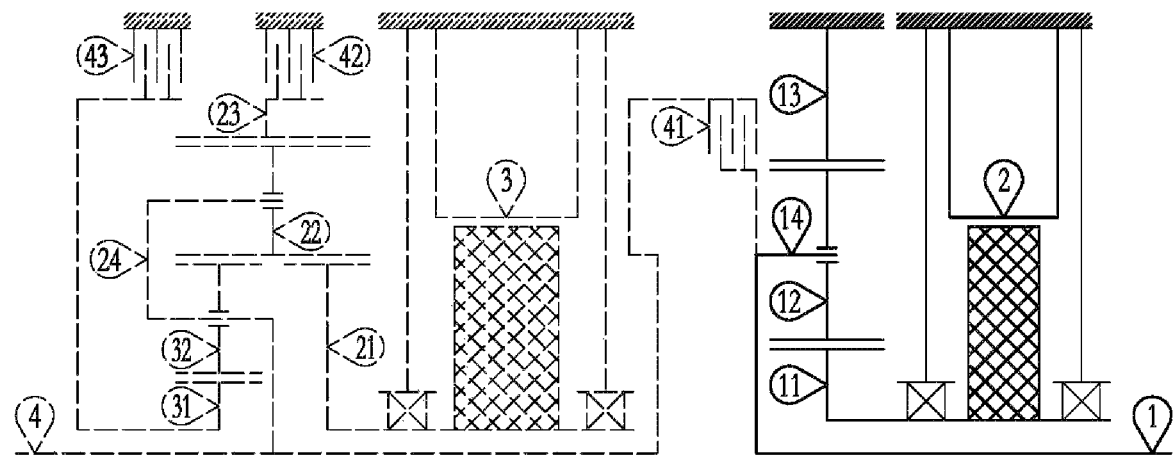
FIG. 10 is a schematic diagram of a mechanical structure of an idle power generation gear according to an embodiment of the present disclosure.
Figure 11:
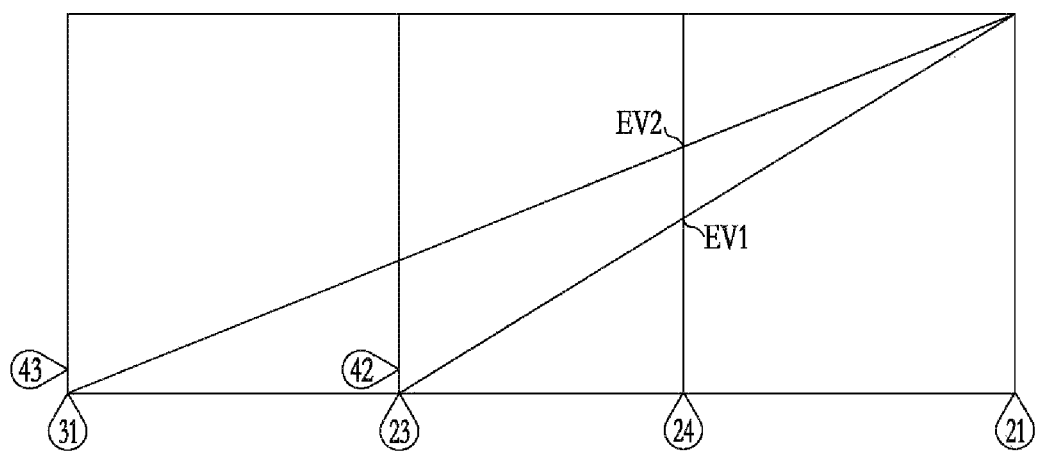
FIG. 11 is a lever principle diagram of an EV gear according to an embodiment of the present disclosure.

The following clearly and completely describes the technical solutions in the embodiments of the present disclosure with reference to the accompanying drawings of the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A two-gear and dual-motor driven hybrid power transmission device includes an input shaft 1, a front-end motor 2, a rear-end motor 3, an output shaft 4, a first clutch 41, a second clutch 42, a third clutch 43, a front-row planetary gear train, and a rear-row planetary gear train. The front-row planetary gear train includes a first sun gear 11, a first planetary gear 12, a first ring gear 13, and a first planet carrier 14. The rear-row planetary gear train comprises a second sun gear 21, a second planetary gear 22, a second ring gear 23, a second planet carrier 24, a third sun gear 31, and a third planetary gear 32. An input end of the input shaft 1 is connected to a power system of an engine, and the first sun gear 11 and the first planet carrier 14 are sleeved outside the input shaft 1. The first planet carrier 14 is fixedly connected to the input shaft 1, and the first planet carrier 14 is connected to one end of the first clutch 41. The first planetary gear 12 is arranged on the first planet carrier 14, and the first planetary gear 12 is meshed with both the first sun gear 11 and the first ring gear 13. The first ring gear 13 is fixedly installed on a transmission housing. The first sun gear 11 is connected to a rotor of the front-end motor 2, and a stator of the front-end motor 2 is fixedly connected to the transmission housing. Another end of the first clutch 41 is connected to an input end of the output shaft 4, an output end of the output shaft 4 is in transmission connection with a vehicle rear axle. The second sun gear 21, the second planet carrier 24 and the third sun gear 31 are sleeved outside the output shaft 4. The second planet carrier 24 is fixedly connected to the output shaft 4. The second planetary gear 22 and the third planetary gear 32 are arranged on the second planet carrier 24. The second planetary gear 22 is meshed with all the second sun gear 21, the second ring gear 23 and the third planetary gear 32. The second sun gear 21 is connected to a rotor of the rear-end motor 3, and a stator of the rear-end motor 3 is fixedly connected to the transmission housing. The second ring gear 23 is connected to one end of the second clutch 42. The third planetary gear 32 is meshed with the third sun gear 31. The third sun gear 31 is connected to one end of the third clutch 43, and another end of the second clutch 42 and another end of the third clutch 43 are both connected to the transmission housing.

Power output from all the engine, the front-end motor 2, and the rear-end motor is used as a power source of the transmission device.

Through different combinations of the first clutch 41, the second clutch 42, and the third clutch 43, as well as different operating states of the engine, the front-end motor 2, and the rear-end motor 3, different speed ratios and different gear operating modes of the planetary mechanisms are achieved.

The present disclosure provides a transmission method for a first gear of an EV mode of a two-gear and dual-motor driven hybrid power transmission device, including the following steps:

S1. The engine and the front-end motor 2 are arranged in a non-operating state, the first clutch 41 and the third clutch 43 are arranged in a disengaged state, the second clutch 42 is arranged in an engaged state, and the rear-end motor 3 is arranged in an operating state, power output from only the rear-end motor 3 is used as a power source of the transmission device;

S2. The rear-end motor 3 is started to drive the second sun gear 21 to rotate;

S3. A position of the second ring gear 23 is fixed by the second clutch 42 in the engaged state, so as to drive the second planetary gear 22 to rotate by the second sun gear 21;

S4. The second planet carrier 24 is driven to rotate by the second planetary gear 22; and S5. The output shaft 4 is driven to rotate by the second planet carrier 24, so as to output power.

The present disclosure provides a transmission method for a second gear of an EV mode of a two-gear and dual-motor driven hybrid power transmission device, including the following steps:

S1. The engine and the front-end motor 2 are arranged in a non-operating state, the first clutch 41 and the second clutch 42 are arranged in a disengaged state, the third clutch 43 is arranged in an engaged state, and the rear-end motor 3 is arranged in an operating state, power output from only the rear-end motor 3 is used as a power source of the transmission device;

S2. The rear-end motor 3 is started to drive the second sun gear 21 to rotate;

S3. The second planetary gear 22 is driven to rotate by second sun gear 21;

S4. A position of the third sun gear 31 is fixed by the third clutch 43 in the engaged state, so that the third planetary gear 32 and the second planet carrier 24 are both driven to rotate by the second planetary gear 22; and S5. The output shaft 4 is driven to rotate by the second planet carrier 24, so as to output power.

The present disclosure provides a transmission method for a first gear of a series mode of a two-gear and dual-motor driven hybrid power transmission device, including the following steps:

S1. The front-end motor 2, the rear-end motor 3 and the engine are all arranged in an operating state, the first clutch 41 and the third clutch 43 are arranged in a disengaged state, and the second clutch 42 is arranged in an engaged state;

S2. The engine is started to drive the input shaft 1 to rotate;

S3. The first planet carrier 14 is driven to rotate by the input shaft 1;

S4. As a first ring gear 13 is fixed by a transmission housing, the first planetary gear 12 is driven to rotate by the first planet carrier 14;

S5. The first sun gear 11 is driven to rotate by the first planetary gear 12;

S6. A rotor of the front-end motor 2 is driven to rotate by the first sun gear 11, and energy is stored in a battery when the front-end motor 2 generates electric power;

S7. The rear-end motor 3 is powered by the battery;

S8. The second sun gear 21 is driven to rotate by the rear-end motor 3;

S9. A position of the second ring gear 23 is fixed by the second clutch 42 in the engaged state, so that the second planetary gear 22 is driven to rotate by the second sun gear 21;

S10. The second planet carrier 24 is driven to rotate by second planetary gear 22; and S11. The output shaft 4 is driven to rotate by the second planet carrier 24, so as to output power.

The present disclosure provides a transmission method for a second gear of a series mode of a two-gear and dual-motor driven hybrid power transmission device, including the following steps:

S1. The front-end motor 2, the rear-end motor 3 and the engine are all arranged in an operating state, the first clutch 41 and the second clutch 42 are arranged in a disengaged state, and the third clutch 43 is arranged in an engaged state;

S2. The engine is started to drive the input shaft 1 to rotate;

S3. The first planet carrier 14 is driven to rotate by the input shaft 1;

S4. As a first ring gear 13 is fixed by a transmission housing, the first planetary gear 12 is driven to rotate by the first planet carrier 14;

S5. The first sun gear 11 is driven to rotate by the first planetary gear 12;

S6. A rotor of the front-end motor 2 is driven to rotate by the first sun gear 11, and energy is stored in a battery when the front-end motor 2 generates electric power;

S7. The rear-end motor 3 is powered by the battery;

S8. The second sun gear 21 is driven to rotate by the rear-end motor 3;

S9. A position of the third sun gear 31 is fixed by the third clutch 43 in the engaged state, so that the third planetary gear 32 and the second planet carrier 24 are both driven to rotate by the second planetary gear 22; and S10. The output shaft 4 is driven to rotate by the second planet carrier 24, so as to output power.

The present disclosure provides a transmission method for a first gear of a parallel mode of a two-gear and dual-motor driven hybrid power transmission device, including the following steps:

S1. The front-end motor 2 is arranged in a non-operating state, the first clutch 41 and the second clutch 42 are arranged in an engaged state, the third clutch 43 is arranged in a disengaged state, and the engine and the rear-end motor 3 are arranged in an operating state, power output from both the engine and the rear-end motor 3 is used for the transmission device;

S2. The engine is started to drive the input shaft 1 to rotate, meanwhile the rear-end motor 3 is started to drive a second sun gear 21 to rotate;

S3. The first planet carrier 41 is driven to rotate by input shaft 1, and the first clutch 41 is driven to rotate by the first planet carrier 14;

S4. A position of the second ring gear 23 is fixed by the second clutch 42 in the engaged state, the second planetary gear 22 is driven to rotate by second sun gear 21, and the second planet carrier 24 is driven to rotate by the second planetary gear 22; and S5. The output shaft 4 is driven to rotate by both the first clutch 41 and the second planet carrier 24, so as to output power.

The present disclosure provides a transmission method for a second gear of a parallel mode of a two-gear and dual-motor driven hybrid power transmission device, including the following steps:

S1. The front-end motor 2 is arranged in a non-operating state, the first clutch 41 and the third clutch 43 are arranged in an engaged state, the second clutch 42 is arranged in a disengaged state, and the engine and the rear-end motor 3 are arranged in an operating state, power output from both the engine and the rear-end motor 3 is used for the transmission device;

S2. The engine is started to drive the input shaft 1 to rotate, meanwhile the rear-end motor 3 is started to drive the second sun gear 21 to rotate;

S3. The first planet carrier 41 is driven to rotate by the input shaft 1, and the first clutch 41 is driven to rotate by the first planet carrier 14;

S4. The second planetary gear 22 is driven to rotate by the second sun gear 21; and as a position of a third sun gear 31 is fixed by the third clutch 43 in the engaged state, the third planetary gear 32 and a second planet carrier 24 are both driven to rotate by the second planetary gear 22; and S5. The output shaft 4 is driven to rotate by both the first clutch 41 and the second planet carrier 24, so as to output power.

The present disclosure provides a transmission method for a direct-drive gear of a two-gear and dual-motor driven hybrid power transmission device, including the following steps:

S1. The front-end motor 2 and the rear-end motor 3 are arranged in a non-operating state, the second clutch 42 and the third clutch 43 are arranged in a disengaged state, the first clutch 41 is arranged in an engaged state, and the engine is arranged in an operating state, power output from only the engine is used as a power source of the transmission device;

S2. The engine is started to drive the input shaft 1 to rotate;

S3. The first planet carrier 14 is driven to rotate by the input shaft 1;

S4. The first clutch 41 is driven to rotate by the first planet carrier 14; and S5. The output shaft 4 is driven to rotate by the first clutch 41 drives, so as to output power.

The present disclosure provides a transmission method for a brake recovery gear of a two-gear and dual-motor driven hybrid power transmission device, including the following steps:

S1. The engine and the front-end motor 2 are both arranged in a non-operating state, the first clutch 41 and the third clutch 43 are arranged in a disengaged state, the second clutch 42 is arranged in an engaged state, and the rear-end motor 3 is arranged in an operating state;

S2. The second planet carrier 24 is driven to rotate by the output shaft 4;

S3. The second planetary gear 22 is driven to rotate by the second planet carrier 24;

S4. A position of the second ring gear 23 is fixed by the second clutch 42 in the engaged state, and the second planetary gear 21 is driven to rotate by the second sun gear 22;

S5. The rotor of the rear-end motor 3 is driven to rotate by the second sun gear 21; and S6. Power energy is stored in a battery when the rear-end motor 3 generates electric power, and the power generated by deceleration braking of a wheel system is received by the rear-end motor 3.

The present disclosure provides a transmission method for an idle power generation gear of a two-gear and dual-motor driven hybrid power transmission device, including the following steps:

S1. The engine and the front-end motor 2 are both arranged in an operating state, the first clutch 41, the second clutch 42 and the third clutch 43 are all arranged in a disengaged state, and the rear-end motor 3 is arranged in a non-operating state;

S2. The engine is started to drive the input shaft 1 to rotate;

S3. The first planet carrier 14 is driven to rotate by the input shaft 1;

S4. As the first ring gear 13 is fixed by a transmission housing, the first planetary gear 12 is driven to rotate by the first planet carrier 14;

S5. The first sun gear 11 is driven to rotate by the first planetary gear 12; and S6. The rotor of the front-end motor 2 is driven to rotate by the first sun gear 11, and energy is stored in a battery when the front-end motor 2 generates electric power.

The present disclosure can not only give full play to the respective characteristics of the motor and the engine, but also achieve various power combination forms of the motor and the engine, which not only can meet the cruising range requirements and has low infrastructure requirements, like traditional fuel vehicles, but also can meet the economic requirements and balance various requirements, like pure electric vehicles. Multiple gear modes can be achieved through the cooperation of various elements of the planetary gear trains and various clutches in limited space with fewer parts, which is an important implementation form of the transmission device of the hybrid power vehicle.

It should be noted that it is apparent to those skilled in the art that the present disclosure is not limited to the details of the above exemplary embodiments and can be realized in other specific forms without departing from the spirit or basic characteristics of the present disclosure. Therefore, the embodiments should be considered as exemplary and non-limiting in all aspects, and the scope of the present disclosure is defined by the appended claims rather than the above description, so it is intended to embrace all changes that fall within the meaning and range of equivalents of the claims. Any reference signs in the claims should not be regarded as limiting the claims involved.

In addition, it should be understood that although this specification is described in terms of embodiments, not every embodiment only contains an independent technical solution, and this description of the specification is only for clarity. Those skilled in the art should take the specification as a whole, and the technical solutions in various embodiments can also be appropriately combined to form other embodiments that can be understood by those skilled in the art.

What is claimed is:

1. A two-gear and dual-motor driven hybrid power transmission device, comprising:

an input shaft (1), a front-end motor (2), a rear-end motor (3), an output shaft (4), a first clutch (41), a second clutch (42), a third clutch (43), a front-row planetary gear train, and a rear-row planetary gear train;

the front-row planetary gear train comprises a first sun gear (11), a first planetary gear (12), a first ring gear (13), and a first planet carrier (14);

the rear-row planetary gear train comprises a second sun gear (21), a second planetary gear (22), a second ring gear (23), a second planet carrier (24), a third sun gear (31), and a third planetary gear (32);

an input end of the input shaft (1) is connected to a power system of an engine, the first sun gear (11) and the first planet carrier (14) are sleeved outside the input shaft (1);

the first planet carrier (14) is fixedly connected to the input shaft (1), and the first planet carrier (14) is connected to one end of the first clutch (41);

the first planetary gear (12) is arranged on the first planet carrier (14), and the first planetary gear (12) is meshed with both the first sun gear (11) and the first ring gear (13);

the first ring gear (13) is fixedly installed on a transmission housing;

the first sun gear (11) is connected to a rotor of the front-end motor (2), and a stator of the front-end motor (2) is fixedly connected to the transmission housing;

another end of the first clutch (41) is connected to an input end of the output shaft (4), and an output end of the output shaft (4) is in transmission connection with a vehicle rear axle;

the second sun gear (21), the second planet carrier (24), and the third sun gear (31) are sleeved outside the output shaft (4);

the second planet carrier (24) is fixedly connected to the output shaft (4);

the second planetary gear (22) and the third planetary gear (32) are arranged on the second planet carrier (24);

the second planetary gear (22) is meshed with all the second sun gear (21), the second ring gear (23), and the third planetary gear (32);

the second sun gear (21) is connected to a rotor of the rear-end motor (3), and a stator of the rear-end motor (3) is fixedly connected to the transmission housing;

the second ring gear (23) is connected to one end of the second clutch (42);

the third planetary gear (32) is meshed with the third sun gear (31); and the third sun gear (31) is connected to one end of the third clutch (43), and another end of the second clutch (42) and another end of the third clutch (43) are both connected to the transmission housing.

2. A transmission method for a first gear of an EV (electric vehicle) mode of the two-gear and dual-motor driven hybrid power transmission device according to claim 1, comprising the following steps:

S1: arranging the engine and the front-end motor (2) in a non-operating state, arranging the first clutch (41) and the third clutch (43) in a disengaged state, arranging the second clutch (42) in an engaged state, and arranging the rear-end motor (3) in an operating state;

S2: starting the rear-end motor (3) to drive the second sun gear (21) to rotate;

S3: fixing, by the second clutch (42) in the engaged state, a position of the second ring gear (23), so as to drive the second planetary gear (22) to rotate by the second sun gear (21);

S4: driving, by the second planetary gear (22), the second planet carrier (24) to rotate; and S5: driving, by the second planet carrier (24), the output shaft (4) to rotate, so as to output power.

3. A transmission method for a second gear of an EV mode of the two-gear and dual-motor driven hybrid power transmission device according to claim 1, comprising the following steps:

S1: arranging the engine and the front-end motor (2) in a non-operating state, arranging the first clutch (41) and the second clutch (42) in a disengaged state, arranging the third clutch (43) in an engaged state, and arranging the rear-end motor (3) in an operating state;

S2: starting the rear-end motor (3) to drive the second sun gear (21) to rotate;

S3: driving, by the second sun gear (21), the second planetary gear (22) to rotate; and S4: fixing, by the third clutch (43) in the engaged state, a position of the third sun gear (31), so as to drive both the third planetary gear (32) and the second planet carrier (24) to rotate by the second planetary gear (22); and S5: driving, by the second planet carrier (24), the output shaft (4) to rotate, so as to output power.

4. A transmission method for a first gear of a series mode of the two-gear and dual-motor driven hybrid power transmission device according to claim 1, comprising the following steps:

S1: arranging all the front-end motor (2), the rear-end motor (3), and the engine in an operating state, arranging the first clutch (41) and the third clutch (43) in a disengaged state, and arranging the second clutch (42) in an engaged state;

S2: starting the engine to drive the input shaft (1) to rotate;

S3: driving, by the input shaft (1), the first planet carrier (14) to rotate;

S4: driving, by the first planet carrier (14), the first planetary gear (12) to rotate;

S5: driving, by the first planetary gear (12), the first sun gear (11) to rotate;

S6: driving, by the first sun gear (11), a rotor of the front-end motor (2) to rotate, and storing energy in a battery when the front-end motor (2) generates electric power;

S7: powering the rear-end motor (3) by the battery;

S8: driving, by the rear-end motor (3), the second sun gear (21) to rotate;

S9: fixing, by the second clutch (42) in the engaged state, a position of the second ring gear (23), so as to drive the second planetary gear (22) to rotate by the second sun gear (21);

S10: driving, by the second planetary gear (22), the second planet carrier (24) to rotate; and S11: driving, by the second planet carrier (24), the output shaft (4) to rotate, so as to output power.

5. A transmission method for a second gear of a series mode of the two-gear and dual-motor driven hybrid power transmission device according to claim 1, comprising the following steps:

S1: arranging all the front-end motor (2), the rear-end motor (3) and the engine in an operating state, arranging the first clutch (41) and the second clutch (42) in a disengaged state, and arranging the third clutch (43) in an engaged state;

S2: starting the engine to drive the input shaft (1) to rotate;

S3: driving, by the input shaft (1), the first planet carrier (14) to rotate;

S4: driving, by the first planet carrier (14), the first planetary gear (12) to rotate;

S5: driving, by the first planetary gear (12), the first sun gear (11) to rotate;

S6: driving, by the first sun gear (11), a rotor of the front-end motor (2) to rotate, and storing energy in a battery when the front-end motor (2) generates electric power;

S7: powering the rear-end motor (3) by the battery;

S8: driving, by the rear-end motor (3), the second sun gear (21) to rotate;

S9: fixing, by the third clutch (43) in the engaged state, a position of the third sun gear (31), so as to drive both the third planetary gear (32) and the second planet carrier (24) to rotate by the second planetary gear (22); and S10: driving, by the second planet carrier (24), the output shaft (4) to rotate, so as to output power.

6. A transmission method for a first gear of a parallel mode of the two-gear and dual-motor driven hybrid power transmission device according to claim 1, comprising the following steps:

S1: arranging the front-end motor (2) in a non-operating state, arranging the first clutch (41) and the second clutch (42) in an engaged state, arranging the third clutch (43) in a disengaged state, and arranging the engine and the rear-end motor (3) in an operating state;

S2: starting the engine to drive the input shaft (1) to rotate, meanwhile starting the rear-end motor (3) to drive the second sun gear (21) to rotate;

S3: driving, by the input shaft (1), the first planet carrier (14) to rotate, and driving, by the first planet carrier (14), the first clutch (41) to rotate;

S4: fixing, by the second clutch (42) in the engaged state, a position of the second ring gear (23), so as to drive the second planetary gear (22) to rotate by the second sun gear (21), and driving, by the second planetary gear (22), the second planet carrier (24) to rotate; and S5: driving, by both the first clutch (41) and the second planet carrier (24), the output shaft (4) to rotate, so as to output power.

7. A transmission method for a second gear of a parallel mode of the two-gear and dual-motor driven hybrid power transmission device according to claim 1, comprising the following steps:

S1: arranging the front-end motor (2) in a non-operating state, arranging the first clutch (41) and the third clutch (43) in an engaged state, arranging the second clutch (42) in a disengaged state, and arranging the engine and the rear-end motor (3) in an operating state;

S2: starting the engine to drive the input shaft (1) to rotate, meanwhile starting the rear-end motor (3) to drive the second sun gear (21) to rotate;

S3: driving, by the input shaft (1), the first planet carrier (14) to rotate, and driving, by the first planet carrier (14), the first clutch (41) to rotate;

S4: driving, by the second sun gear (21), the second planetary gear (22) to rotate; and as a position of a third sun gear (31) is fixed by the third clutch (43) in the engaged state, the third planetary gear (32) and the second planet carrier (24) are both driven to rotate by the second planetary gear (22); and S5: driving, by both the first clutch (41) and the second planet carrier (24), the output shaft (4) to rotate, so as to output power.

8. A transmission method for a direct-drive mode of the two-gear and dual-motor driven hybrid power transmission device according to claim 1, comprising the following steps:

S1: arranging the front-end motor (2) and the rear-end motor (3) in a non-operating state, arranging the second clutch (42) and the third clutch (43) in a disengaged state, arranging the first clutch (41) in an engaged state, and arranging the engine in an operating state;

S2: starting the engine to drive the input shaft (1) to rotate;

S3: driving, by the input shaft (1), the first planet carrier (14) to rotate;

S4: driving, by the first planet carrier (14), the first clutch (41) to rotate; and S5: driving, by the first clutch (41), the output shaft (4) to rotate, so as to output power.

9. A transmission method for a brake recovery gear of the two-gear and dual-motor driven hybrid power transmission device according to claim 1, comprising the following steps:

S1: arranging both the engine and the front-end motor (2) in a non-operating state, arranging the first clutch (41) and the third clutch (43) in a disengaged state, arranging the second clutch (42) in an engaged state, and arranging the rear-end motor (3) in an operating state;

S2: driving, by the output shaft (4), the second planet carrier (24) to rotate;

S3: driving, by the second planet carrier (24), the second planetary gear (22) to rotate;

S4: fixing, by the second clutch (42) in the engaged state, a position of the second ring gear (23), so as to drive the second sun gear (21) to rotate by the second planetary gear (22);

S5: driving, by the second sun gear (21), a rotor of the rear-end motor (3) to rotate; and S6: storing power energy in a battery when the rear-end motor (3) generates electric power.

10. A transmission method for an idle power generation gear of the two-gear and dual-motor driven hybrid power transmission device according to claim 1, comprising the following steps:

S1: arranging both the engine and the front-end motor (2) in an operating state, arranging all the first clutch (41), the second clutch (42) and the third clutch (43) in a disengaged state, and arranging the rear-end motor (3) in a non-operating state;

S2: starting the engine to drive the input shaft (1) to rotate;

S3: driving, by the input shaft (1), the first planet carrier (14) to rotate;

S4: driving, by the first planet carrier (14), the first planetary gear (12) to rotate;

S5: driving, by the first planetary gear (12), the first sun gear (11) to rotate; and S6: driving, by the first sun gear (11), a rotor of the front-end motor (2) to rotate, and storing energy in a battery when the front-end motor (2) generates electric power.

* * * * *